United States Patent
Hirota (10) Patent No.: US 10,742,857 B2
(45) Date of Patent: Aug. 11, 2020

(54) OCCUPANT MONITORING APPARATUS

(71) Applicant: Satoshi Hirota, Aichi (JP)

(72) Inventor: Satoshi Hirota, Aichi (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/352,665

(22) Filed: Mar. 13, 2019

(65) Prior Publication Data

US 2019/0289175 A1    Sep. 19, 2019

(30) Foreign Application Priority Data

Mar. 15, 2018 (JP) ................... 2018-047438

(51) Int. Cl.
| | |
|---|---|
| *H04N 5/225* | (2006.01) |
| *B60R 11/04* | (2006.01) |
| *B60W 40/08* | (2012.01) |
| *G03B 15/03* | (2006.01) |

(52) U.S. Cl.
CPC ........... *H04N 5/2254* (2013.01); *B60R 11/04* (2013.01); *B60W 40/08* (2013.01); *G03B 15/03* (2013.01); *H04N 5/2252* (2013.01); *H04N 5/2256* (2013.01); *B60W 2040/0872* (2013.01)

(58) Field of Classification Search
None
See application file for complete search history.

(56) References Cited

U.S. PATENT DOCUMENTS 4,165,607 A * 8/1979 Fedorowicz ........... G04G 17/02
    349/149
2009/0073307 A1* 3/2009 Kramer ................ H04N 5/2354
    348/370

FOREIGN PATENT DOCUMENTS

| JP | 2004-078778 A | 3/2004 |
|---|---|---|
| JP | 2004-170696 A | 6/2004 |
| JP | 2009-200718 A | 9/2009 |
| JP | 2017-146529 A | 8/2017 |
| WO | 2014/203307 A1 | 12/2014 |

* cited by examiner

*Primary Examiner* — Shadan E Haghani
(74) *Attorney, Agent, or Firm* — Osha Liang LLP (57) ABSTRACT

An occupant monitoring apparatus includes: an imaging unit; an illumination unit; a casing in which the imaging unit and the illumination unit are installed; optical films provided on driver's sides of the imaging unit and the illumination unit and optically adjusting incident light; a cover covering the imaging unit, the illumination unit, the casing, and the optical films; windows provided in the cover so as to face the optical films; supports provided on window frame portions; and supports provided in the casing so as to face the window frame portions. The supports provided in the casing support end portions of the optical films from the windows side. The supports provided on the window frame portions support the end portions from an imaging unit side or an illumination unit side. The optical films are sandwiched in the thickness direction.

8 Claims, 10 Drawing Sheets

Transverse cross-sectional view of portion A

FIG. 7

Enlarged view of portion B

FIG. 8

Enlarged view of portion C

… (1) OCCUPANT MONITORING APPARATUS

CROSS-REFERENCE TO RELATED APPLICATION

This application is based on Japanese Patent Application No. 2018-047438 filed with the Japan Patent Office on Mar. 15, 2018, the entire contents of which are incorporated herein by reference.

FIELD

The present invention relates to an occupant monitoring apparatus that monitors an occupant of a vehicle according to an image captured by an imaging unit.

BACKGROUND

In order to prevent a vehicle accident or the like, an occupant monitoring apparatus that monitors the physical condition of an occupant of a vehicle according to an image captured by an imaging unit may be installed in a passenger compartment.

For example, in the occupant monitoring apparatus disclosed in JP 2004-78778 A, an image of the vehicle driver's face is captured by an imaging unit configured of an image sensor (imaging element) such as a CCD (Charge Coupled Device) or a CMOS (Complementary Metal Oxide Semiconductor). Thus, the occupant monitoring apparatus monitors the face direction according to the captured image. In addition, in the occupant monitoring apparatus disclosed in JP 2009-200718 A, an illumination unit configured of an LED (light emitting diode) projects light toward the driver's face, and an imaging unit captures an image of the driver's face. Thus, the occupant monitoring apparatus monitors the face direction and the opening and closing degree of the eyes according to the captured image. These monitoring results are output from the occupant monitoring apparatus to an ECU (electronic control unit) on a vehicle side, and are used for traveling control of the vehicle.

In the occupant monitoring apparatus disclosed in JP 2009-200718 A, the imaging unit is provided on a steering column of the vehicle, and the illumination unit is provided on a steering wheel. However, there is also an occupant monitoring apparatus in which an imaging unit and an illumination unit are installed in an identical casing. In addition, an occupant monitoring apparatus may also be installed at a place other than a steering of a vehicle.

An optical film for optically adjusting light from an occupant may be provided on an occupant side of an imaging unit. In addition, an optical film for optically adjusting light projected from an illumination unit may be provided on an occupant side of the illumination unit.

Each of JP 2017-146529 A, Domestic re-publication of PCT international application WO2014/203307, JP 2004-170696 A discloses an optical film fixing structure. In JP 2017-146529 A, an optical film is fixed to a frame with a double-sided tape, is sandwiched between a case and a casing, and is bonded to the casing. In Domestic re-publication of PCT international application WO2014/203307, an optical film is stuck on a holder curved by a tool, and then the holder detached from the tool is restored to a flat state. Thus, tension is applied on the optical film and deflection and waviness of the optical film is removed. In JP 2004-170696 A, the optical film is sandwiched between a case of a film fixing frame and a cover, then the film fixing frame is inserted into a slit provided in a casing, and thus the optical film is fixed to the casing.

In an occupant monitoring apparatus, for example, in a case where an adhesive is used to fix an optical film, it is necessary to apply and cure the adhesive. Therefore, working processes increase in number during assembly and become complicated. Further, variations in the coating amount of the adhesive or the like may cause the optical film to be distorted, which may degrade the performance of the optical film. In addition, in the case of using a double-sided tape, an adhesive property of the double-sided tape may be lowered due to changes in temperature and humidity of the surrounding environment and aged deterioration, and the optical film may be peeled off. In addition, in a case where a dedicated fixing member only for fixing the optical film is provided, the number of components increases. Thus, the working processes during assembly also increase in number and become complicated.

SUMMARY

An object of the present invention is to provide an occupant monitoring apparatus capable of reliably fixing an optical film without increasing the number of working processes during assembly.

An occupant monitoring apparatus according to the present invention includes: an imaging unit configured to capture an image of an occupant of a vehicle; an illumination unit configured to project light toward an occupant; a casing in which one of the imaging unit and the illumination unit is installed; and an optical film provided on an occupant side of one of the imaging unit and the illumination unit and configured to optically adjust incident light. The occupant monitoring apparatus monitors the occupant according to an image captured by the imaging unit. In the present invention, the occupant monitoring apparatus further includes: a covering member configured to cover the imaging unit, the illumination unit, the casing, and the optical film; a window provided in the covering member so as to face the optical film; a first support provided on a window frame portion of the window of the covering member; and a second support provided in the casing so as to face the window frame portion. The first support supports an end portion of the optical film from a window side, and the second support supports the end portion of the optical film from one of an imaging unit side and an illumination unit side. The optical film is sandwiched in a thickness direction of the optical film by the first support and the second support.

According to the above, the end portion of the optical film is supported from the window side by the first support provided in the covering member, and the end portion of the optical film is supported from one of the imaging unit side and the illumination unit side by the second support provided in the casing covered with the covering member. The optical film is sandwiched in the thickness direction by the first support and the second support. Therefore, it is not necessary to use an adhesive or a double-sided tape and it is not necessary to provide a dedicated fixing member for the optical film. Therefore, it is possible to reliably fix the optical film without increasing the number of working processes during assembly of the occupant monitoring apparatus.

In the present invention, a depression may be provided in one of the window frame portion and the casing so as to be adjacent to one of the first support and the second support in a radial direction of the optical film, the first support and the second support may be shifted from each other in the radial direction of the optical film, and the depression and one of the first support and the second support not adjacent to the depression may face each other in the thickness direction of the optical film.

In addition, in the present invention, at least one of the first support and the second support may be provided so as to protrude toward the optical film.

In addition, in the present invention, the optical film may be formed in a rectangular shape, and at least one of the first support and the second support may be provided in a plural manner so as to support vicinities of four corners of the optical film.

In addition, in the present invention, the occupant monitoring apparatus may further include: a first guide portion provided in the casing; and a second guide portion provided in the covering member. The first guide portion and the second guide portion may slide in a state of being engaged with each other and may guide the first support and the second support such that the first support and the second support approach each other in the thickness direction of the optical film.

In addition, in the present invention, the optical film may be made of a polarizing film configured to change a phase of a polarization direction of incident light, and the window may be configured of a hole formed so as to penetrate the covering member. The occupant monitoring apparatus may further include: a transmission plate attached to the window so as to close the hole and configured to transmit light; and a lens configured to form an image of incident light on an imaging surface of the imaging unit. The transmission plate may be provided such that a plate surface of the transmission plate is inclined with respect to an optical axis of the lens.

In addition, in the present invention, the casing may include: a through hole serving as a light path for one of the imaging unit and the illumination unit; and an accommodation portion provided in the casing so as to communicate with the through hole and to face the window and configured to accommodate the optical film. The second support may be provided around the through hole in the accommodation portion.

Further, in the present invention, the imaging unit and the illumination unit are installed in the casing so as to be isolated from each other, and the optical film, the first support, the second support, the through hole, and the accommodation portion may be provided for each of the imaging unit and the illumination unit.

According to the present invention, it is possible to provide an occupant monitoring apparatus capable of reliably fixing an optical film without increasing the number of working processes during assembly.

DETAILED DESCRIPTION

Hereinafter, an embodiment of the present invention will be described with reference to the drawings. In the drawings, identical or corresponding parts are denoted by identical reference signs.

First, an electrical configuration of an occupant monitoring apparatus 100 according to an embodiment will be described with reference to FIG. 1.

Figure 1:
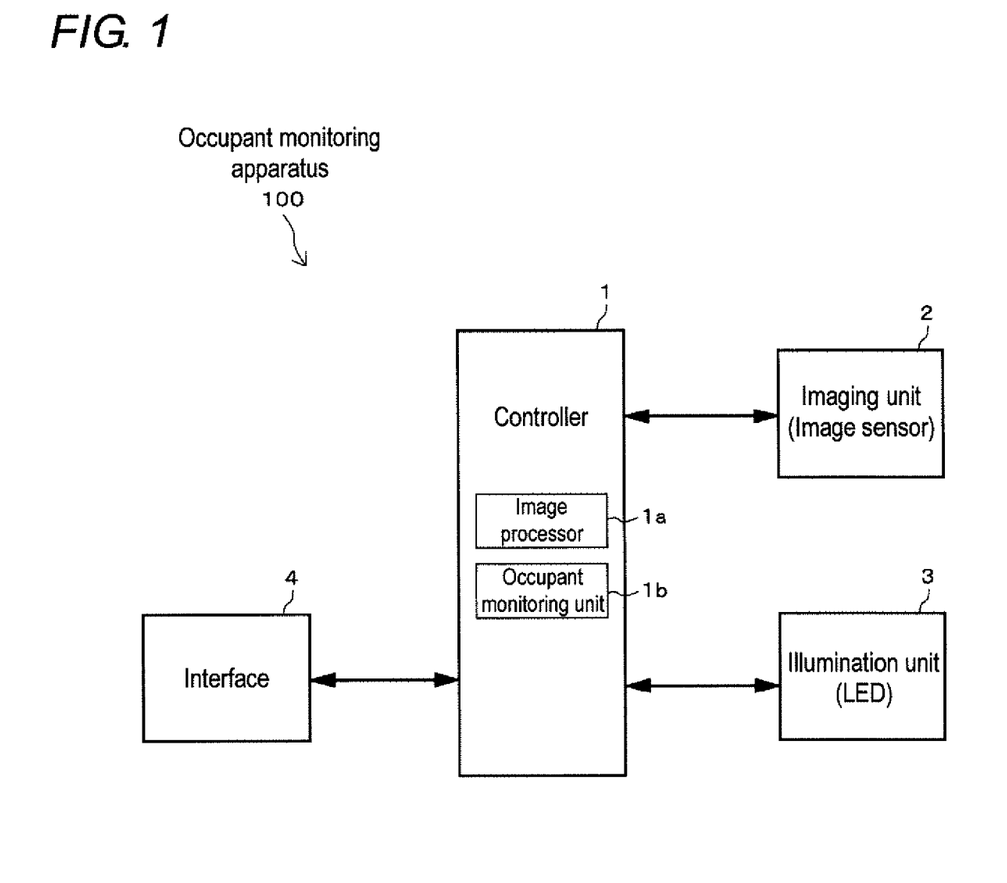
FIG. 1 is an electrical configuration diagram of an occupant monitoring apparatus according to an embodiment of the present invention.

FIG. 1 is an electrical configuration diagram of the occupant monitoring apparatus 100. The occupant monitoring apparatus 100 is installed at a front part inside a passenger compartment of a vehicle such as a four-wheeled automobile. The occupant monitoring apparatus 100 includes a controller 1, an imaging unit 2, an illumination unit 3, and an interface 4.

Figure 5:
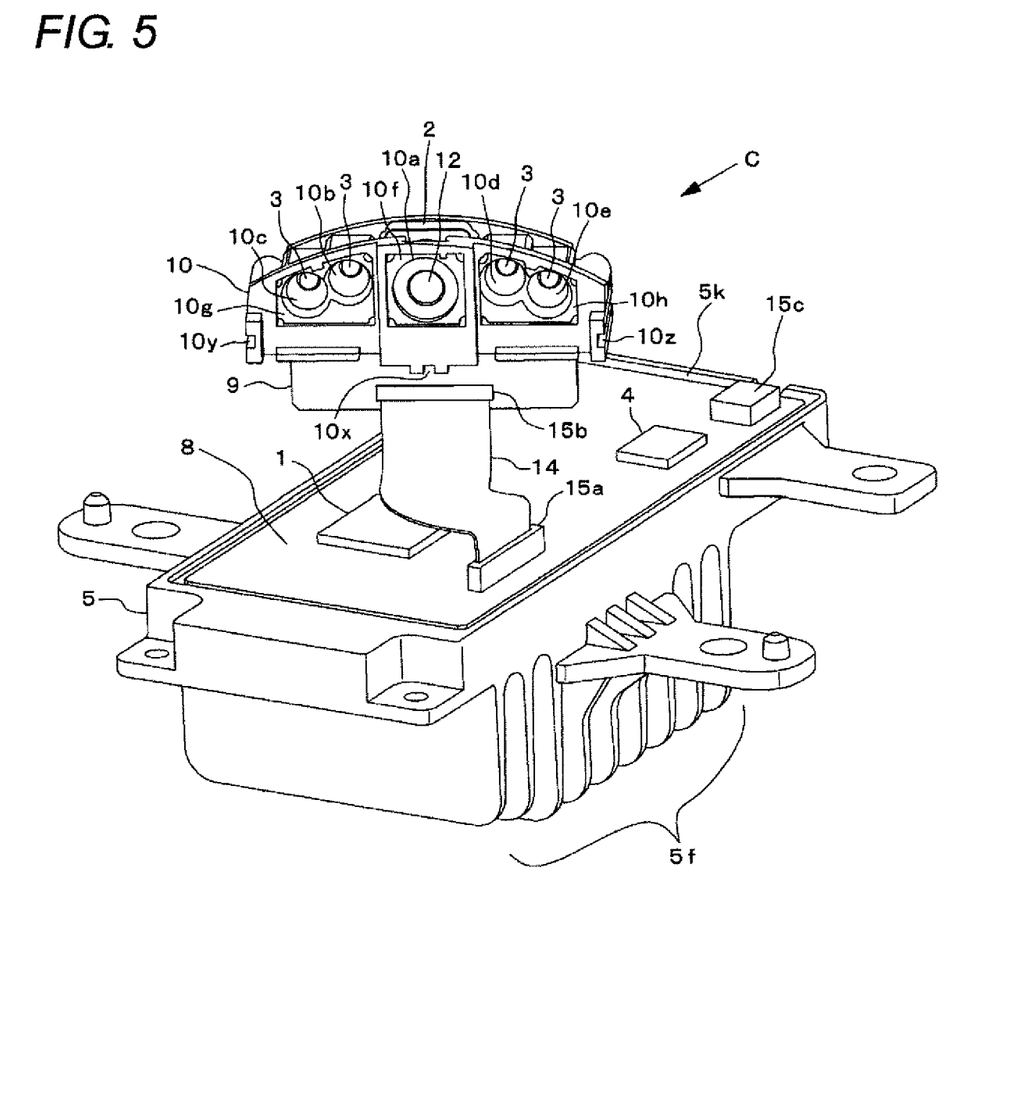
FIG. 5 is a perspective view of a state where optical films are removed from the state in FIG. 4.

The controller 1 is configured of a microcomputer and a memory. The controller 1 includes an image processor 1a and an occupant monitoring unit 1b. The imaging unit 2 is configured of an infrared image sensor (imaging element). The illumination unit 3 is configured of an infrared LED (light emitting diode). Even though the illumination unit 3 is illustrated as one block in FIG. 1, a plurality of illumination units 3 is provided as illustrated in FIG. 5 and the like to be described later. The interface 4 is configured of a circuit for in-vehicle communication such as a CAN (Controller Area Network).

The imaging unit 2 captures an image of the face of a driver, who is an occupant of the vehicle. The illumination unit 3 projects infrared light to an area including the face of the driver seated in a driver's seat of the vehicle. The controller 1 controls imaging operation of the imaging unit 2 and light emission operation of the illumination unit 3.

The image processor 1a of the controller 1 performs image processing on an image captured by the imaging unit 2 and detects feature points of the face of the driver in time series. The occupant monitoring unit 1b detects condition such as the face direction, opening or closing of the eyes, and the sight line of the driver according to changes in the feature points of the face, monitors these changes, and determines whether or not there is no abnormality that may hinder the driver from driving the vehicle. The controller 1 outputs the monitoring result of the occupant monitoring unit 1b to another ECU and the like provided in the vehicle via the interface 4. In addition, the controller 1 receives information on vehicle speed of the vehicle, whether or not the driver is in the vehicle, and the like from other ECUs and various sensors provided in the vehicle.

Next, a mechanical configuration of the occupant monitoring apparatus 100 will be described with reference to FIGS. 2 to 10.

Figure 2:
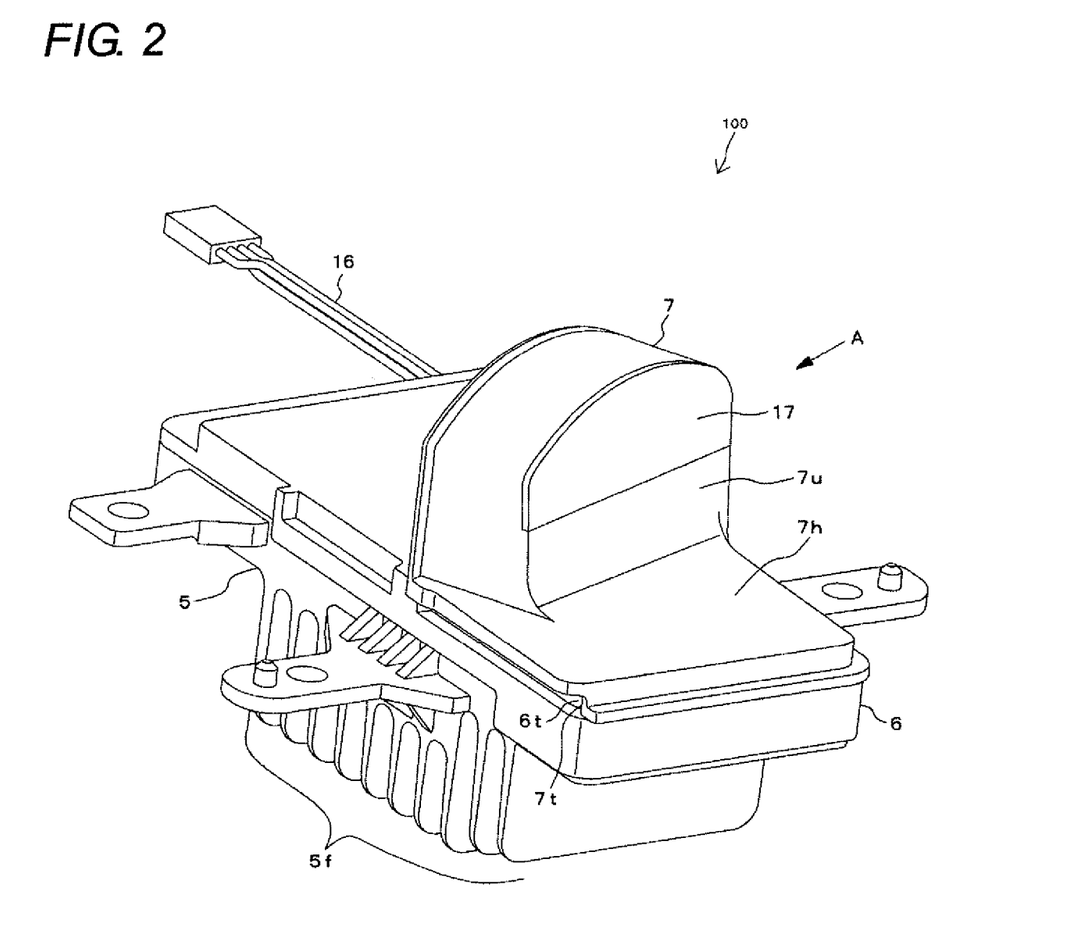
FIG. 2 is a perspective view of the occupant monitoring apparatus according to the embodiment of the present invention.
Figure 3:
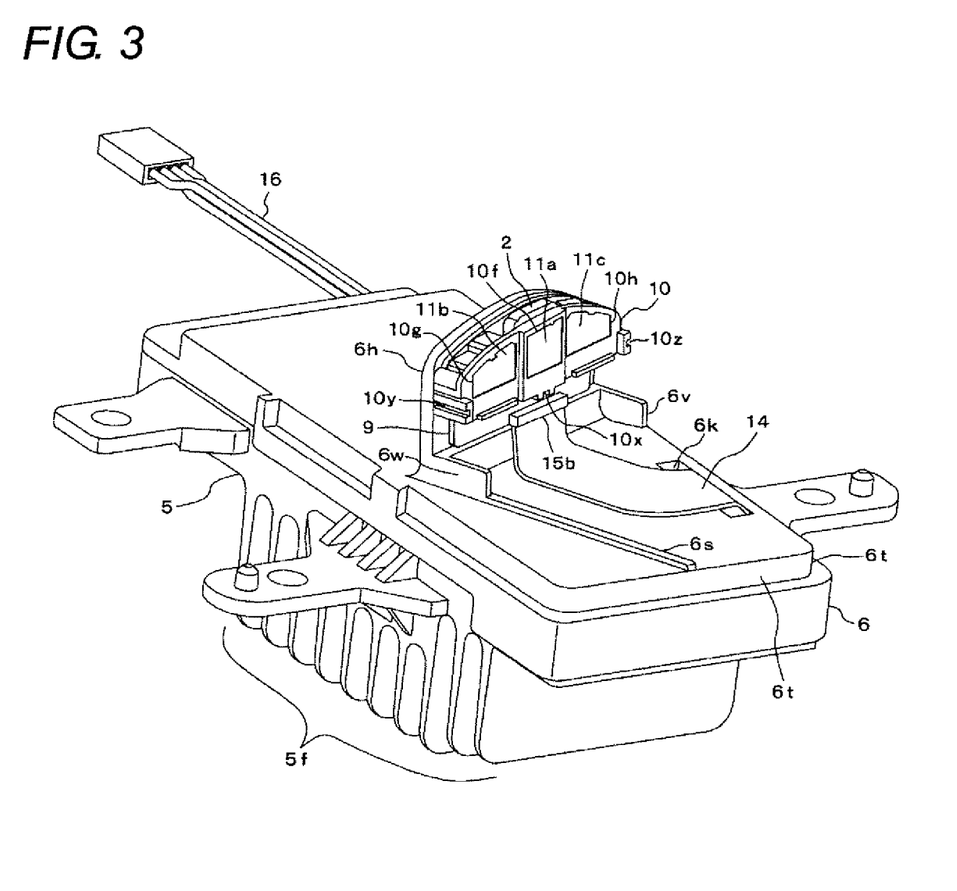
FIG. 3 is a perspective view of a state where a cover is removed from the occupant monitoring apparatus in FIG. 2.
Figure 4:
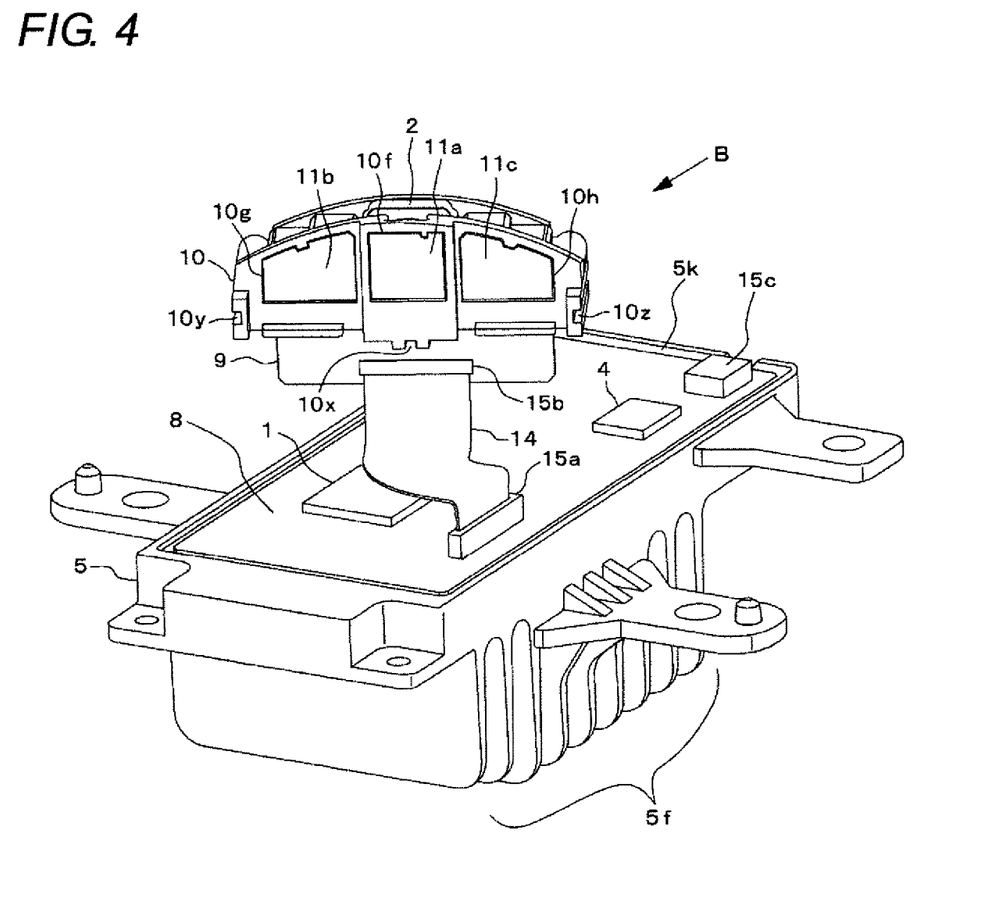
FIG. 4 is a perspective view of a state where a lid body and a harness are removed from the state in FIG. 3.
Figure 6:
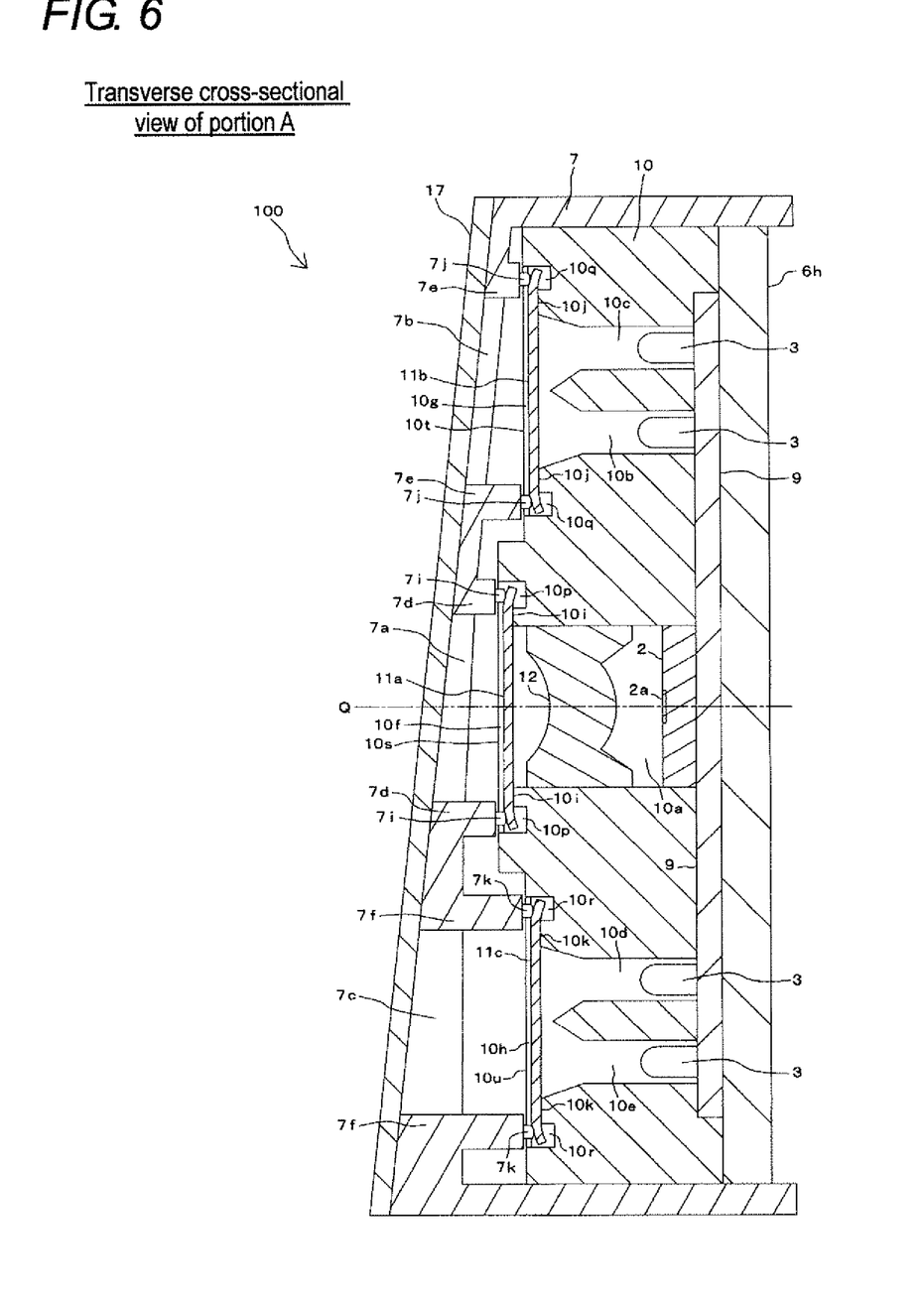
FIG. 6 is a transverse cross-sectional view of portion A in FIG. 2.
Figure 7:
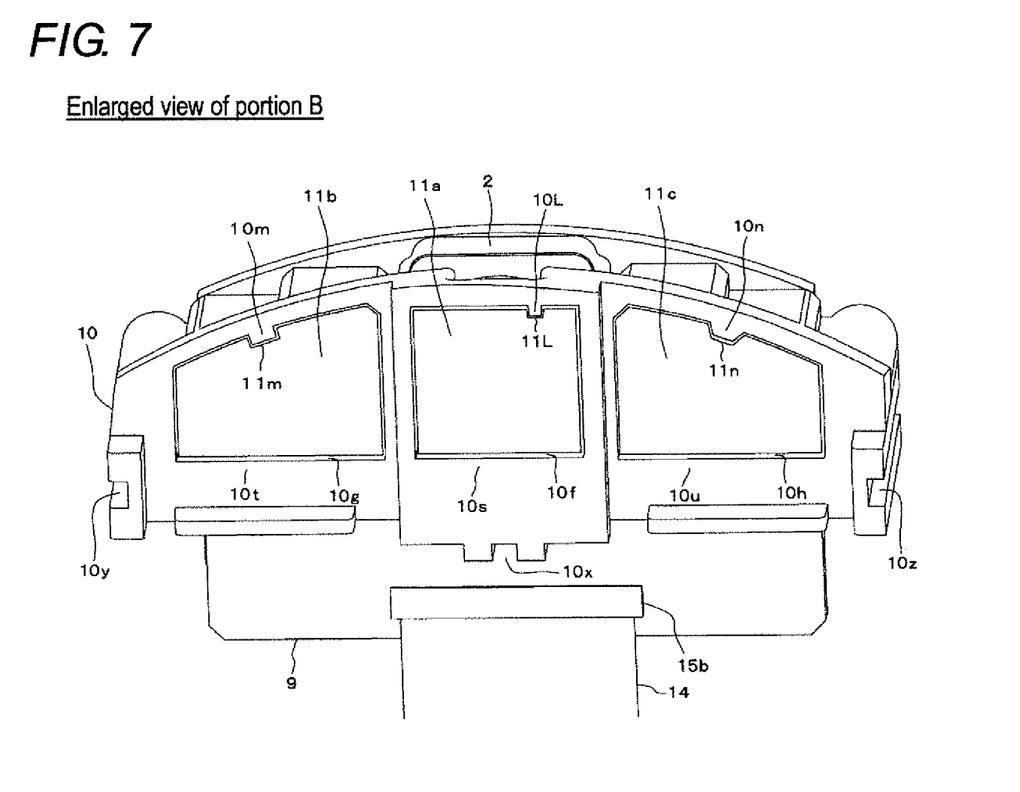
FIG. 7 is an enlarged view of portion B in FIG. 4.
Figure 8:
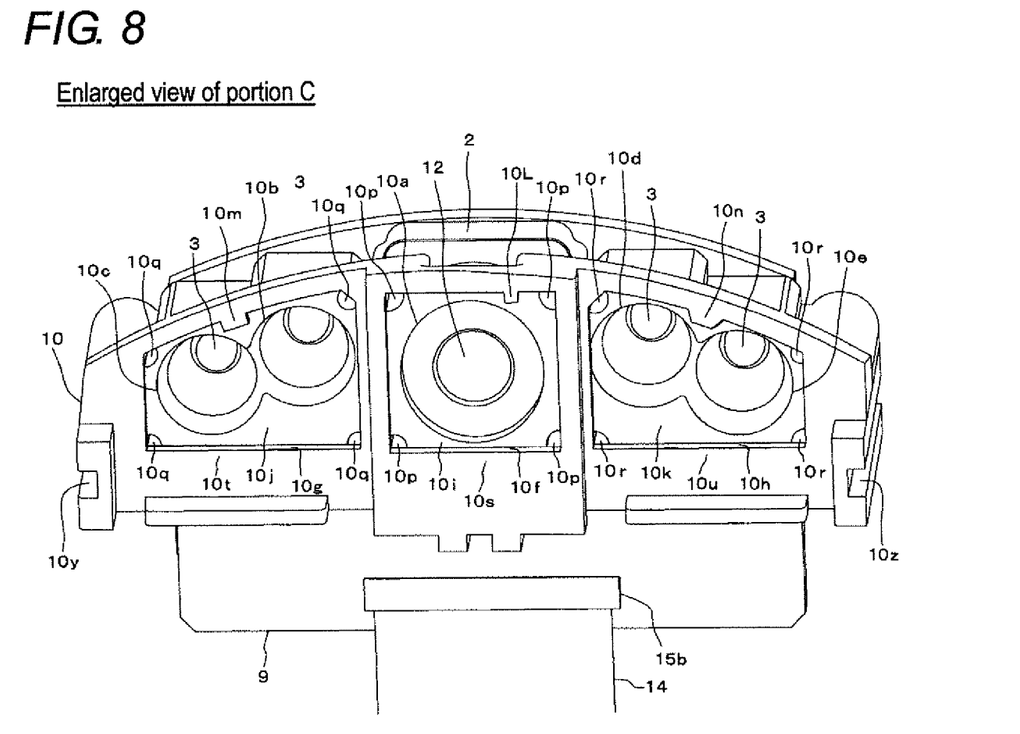
FIG. 8 is an enlarged view of portion C in FIG. 5.
Figure 9:
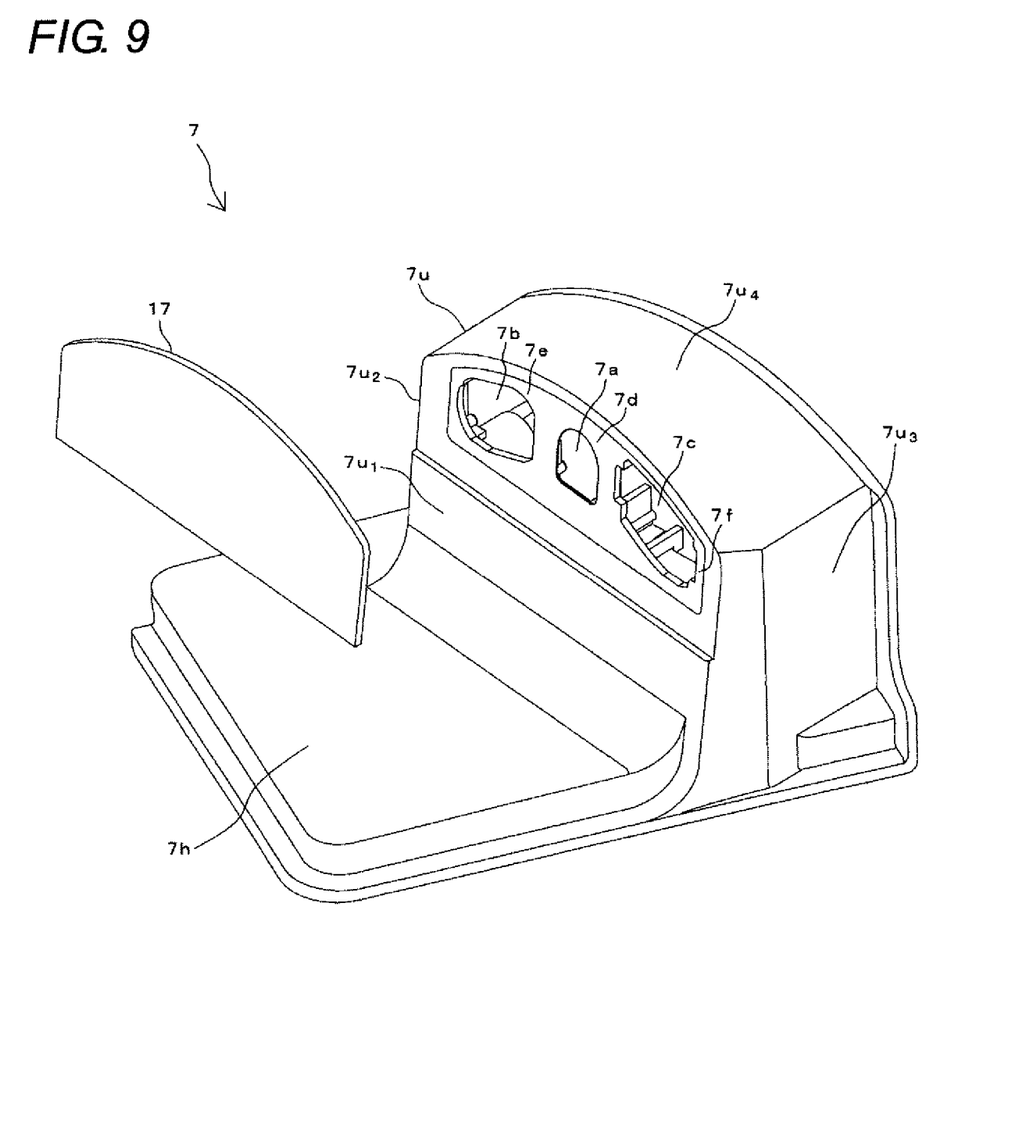
FIG. 9 is a perspective view illustrating the outside of the cover in FIG. 2.
Figure 10:
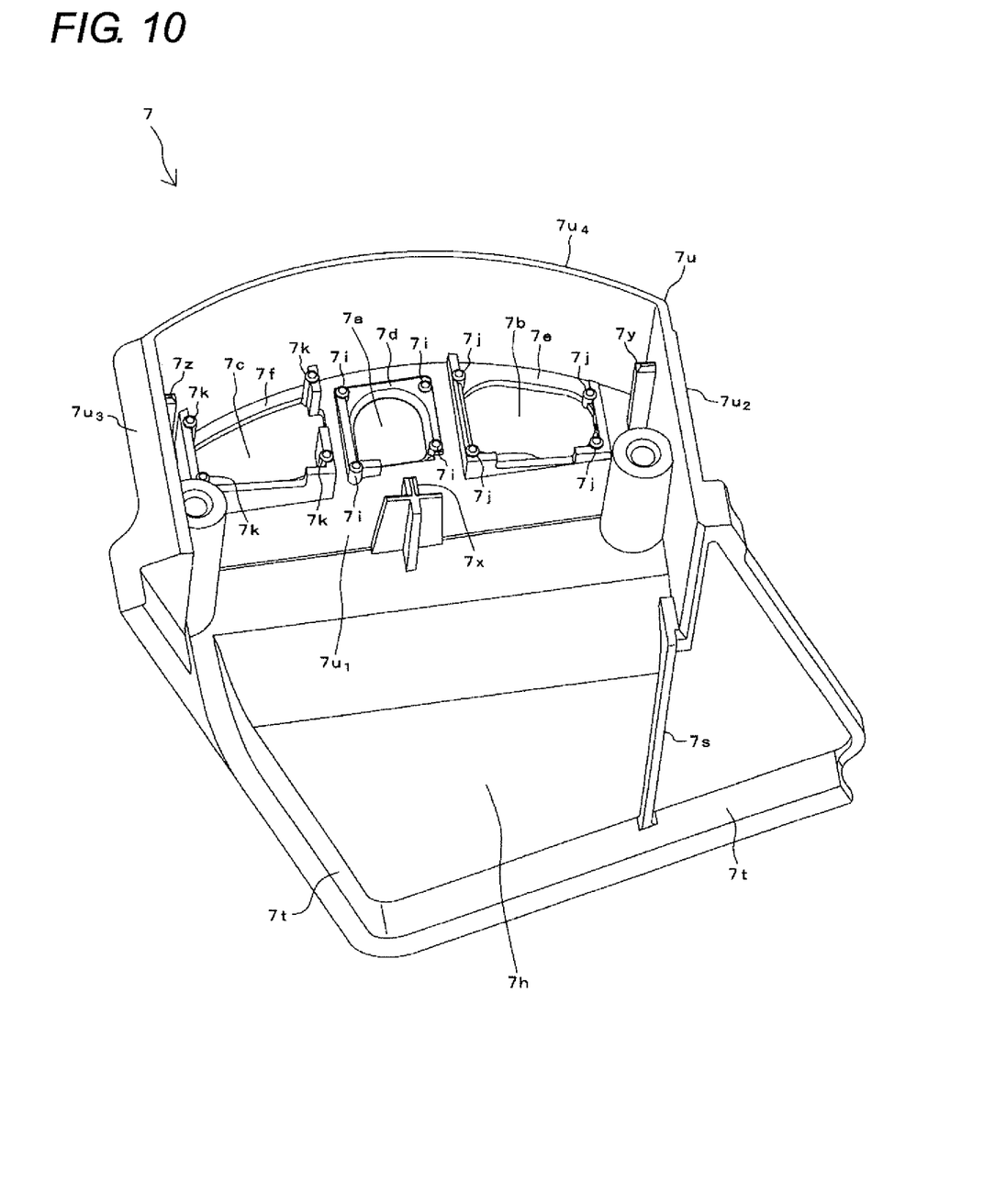
FIG. 10 is a perspective view illustrating the inside of the cover in FIG. 2.

FIG. 2 is a perspective view of the occupant monitoring apparatus 100. FIG. 3 is a perspective view of a state where the cover 7 is removed from the occupant monitoring apparatus 100 in FIG. 2. FIG. 4 is a perspective view of a state where a lid body 6 and a harness 16 are removed from the state in FIG. 3. FIG. 5 is a perspective view of a state where optical films 11a, 11b, 11c are removed from the state in FIG. 4. FIG. 6 is a transverse cross-sectional view of portion A in FIG. 2. FIG. 7 is an enlarged view of portion B in FIG. 4. FIG. 8 is an enlarged view of portion C in FIG. 5. FIG. 9 is a perspective view illustrating the outside of the cover 7. FIG. 10 is a perspective view illustrating the inside of the cover 7.

As illustrated in FIG. 2, the occupant monitoring apparatus 100 is installed in the passenger compartment of the vehicle in a posture such that a case 5 is located at a lower part, the cover 7 is located at an upper part, and the side surface of the case 5 on a harness 16 side is directed to the front of the vehicle. In addition, the occupant monitoring apparatus 100 is installed at a center part of a dashboard located diagonally in front of the driver or an upper part of a center console in order to widen the field of view of the front of the driver of the vehicle.

The case 5 is made of metal or synthetic resin with high thermal conductivity. As illustrated in FIGS. 4 and 5, the case 5 is formed in a rectangular box shape. A fin-shaped heat dissipation unit 5f is provided at a lower part of the case 5. A main board 8 is stored inside the case 5.

The controller 1, the interface 4, connectors 15a, 15c, and other electronic components and electric circuits (not illustrated) are mounted on the main board 8. Each of the controller 1 and the interface 4 is configured of a semiconductor element and the like. One end of an FPC (Flexible Printed Circuit) 14 is connected to the connector 15a. One end of the harness 16 illustrated in FIGS. 2 and 3 is connected to the connector 15c.

An opening 5k of the case 5 opening upward is a storage port for storing the main board 8. As illustrated in FIGS. 2 and 3, the opening 5k is closed by the lid body 6. The case 5 and the lid body 6 are fixed by a screw or the like, not illustrated.

The lid body 6 is made of metal or synthetic resin. As illustrated in FIG. 3, the lid body 6 includes a holder portion 6h, a step portion 6t, a through hole 6k, and guide walls 6s, 6w, 6v. The holder portion 6h protrudes upward from the center of the lid body 6. The front surface (surface directed to the lower right in FIG. 3) of the holder portion 6h is inclined with respect to each side of the case 5 and the lid body 6. The step portion 6t is provided at an end portion of the lid body 6 on the front side (side opposite to the harness 16) with respect to the holder portion 6h. The through hole 6k is formed between the holder portion 6h and the step portion 6t and is open upward.

The guide wall 6s is formed diagonally from the front portion of the lid body 6 toward the holder portion 6h. The guide wall 6w is diagonally formed so as to be continuous with the guide wall 6s from the lower left portion of the holder portion 6h. The guide wall 6v is formed diagonally from the lower right portion of the holder portion 6h toward the right side portion of the lid body 6. The height of each of the guide walls 6w, 6v is higher than the height of the guide wall 6s.

A sub board 9 is provided on the front side of holder portion 6h. The sub board 9 is fixed to the holder portion 6h with a screw or the like, not illustrated. As illustrated in FIG. 5 and the like, the imaging unit 2, the illumination unit 3, the connector 15b, and other electronic components and electric circuits (not illustrated) are mounted on the front surface (surface directed to the lower right in FIG. 3) of the sub board 9.

The other end of the FPC 14 is connected to the connector 15b. As illustrated in FIG. 3, the FPC 14 passes through the through hole 6k of the lid body 6. The FPC 14 electrically connects the sub board 9 and the main board 8.

A casing 10 is provided on the front-surface side of the sub board 9. The casing 10 is made of synthetic resin having a light-shielding property, and is fixed to the holder portion 6h with a screw or the like, not illustrated. As illustrated in FIG. 5 and the like, a plurality of through holes 10a to 10e is formed in the casing 10. Among them, the illumination unit 3 is provided deep inside each of the small-diameter through holes 10b to 10e. The through holes 10b to 10e are paths of light projected from the illumination unit 3.

A lens 12 is fitted in the large-diameter through hole 10a at the center. As illustrated in FIG. 6, the imaging unit 2 is provided behind the lens 12. The lens 12 forms an image of incident light on an imaging surface 2a of the imaging unit 2. The through hole 10a is a path of light incident on the imaging unit 2. The imaging unit 2 and the illumination unit 3 are installed in the casing 10 so as to be isolated from each other in order to prevent light from passing back and forth between the imaging unit 2 and the illumination unit 3. Coating (reflector treatment) for reflecting light is applied to the inner peripheral surfaces of the through holes 10a to 10e.

As illustrated in FIGS. 3, 4, 6, 7, and the like, three accommodation portions 10f, 10g, 10h accommodating therein three optical films 11a, 11 b, 11c, respectively, are provided on the front surface (side surface facing windows 7a to 7c (FIG. 9) of the cover 7) of the casing 10. As illustrated in FIG. 6 and the like, the accommodation portion 10f accommodating the optical film 11a is provided so as to communicate with the through hole 10a. The accommodation portion 10g accommodating the optical film 11b is provided so as to communicate with the through holes 10b, 10c. The accommodation portion 10h accommodating the optical film 11c is provided so as to communicate with the through holes 10d, 10e.

As illustrated in FIG. 7 and the like, the optical films 11a, 11b, 11c are formed in a substantially rectangular shape. As illustrated in FIG. 8, frame walls 10s, 10t, 10u, supports 10i, 10j, 10k, depressions 10p, 10q, 10r, and keys 10L, 10m, 10n are provided in the accommodation portions 10f, 10g, 10h, respectively. As illustrated in FIG. 7 and the like, the frame walls 10s, 10t, 10u are formed in a substantially rectangular frame shape so as to surround the optical films 11a, 11 b, 11c, respectively. The optical films 11a, 11b, 11c are supported from below by at least lower portions of the frame walls 10s, 10t, 10u, respectively.

As illustrated in FIG. 8, the supports 10i, 10j, 10k are formed at inner back surfaces of the accommodation portions 10f, 10g, 10h and are provided around the through holes 10a to 10e. As illustrated in FIG. 6, the supports 10i, 10j, 10k support the optical films 11a, 11 b, 11c from the imaging unit 2 side or the illumination unit 3 side. The supports 10i, 10j, 10k are examples of a "second support" of the present invention.

In a state where the optical films 11a, 11 b, 11c are supported by the frame walls 10s, 10t, 10u and the supports 10i, 10j, 10k of the accommodation portions 10f, 10g, 10h, respectively, the radial direction (vertical direction in FIG. 6) of the optical films 115, 11b, 11c is parallel to the radial direction (inner diameter direction of the frame walls 10s, 10t, 10u) of the accommodation portions 10f, 10g, 10h and the radial direction of the through holes 10a to 10e. In addition, the thickness direction (left-right direction in FIG. 6) of the optical films 11a, 11b, 11c is parallel to the depth direction of the accommodation portions 10f, 10g, 10h and the depth direction of the through holes 10a to 10e. Further, the thickness direction of the optical films 11a, 11b, 11c is also parallel to an optical axis Q of the lens 12.

As illustrated in FIG. 8, the depressions 10p, 10q, 10r are provided near four corners of the frame walls 10s, 10t, 10u, respectively. In addition, the depressions 10p, 10q, 10r are provided so as to be adjacent to the supports 10i, 10j, 10k in the radial direction of the accommodation portions 10f, 10g, 10h (that is, in the radial direction of the optical films 11a, 11 b, 11c). The supports 10i, 10j, 10k exist between the depressions 10p, 10q, 10r and the through holes 10a to 10e.

The keys 10L, 10m, 10n are provided so as to protrude downward from upper portions of the frame walls 10s, 10t, 10u, respectively. The positions of the keys 10L, 10m, 10n with respect to the centers of the frame walls 10s, 10t, 10u and the shapes of the keys 10L, 10m, 10n differ from one another.

As illustrated in FIG. 7 and the like, the optical film 11a is provided with a recess 11L with which the key 10L of the accommodation portion 10f is engaged. The optical film 11b is provided with a recess 11m with which the key 10m of the accommodation portion 10g is engaged. The optical film 11c is provided with a recess 11n with which the key 10n of the accommodation portion 10h is engaged. By engaging these keys 10L, 10m, 10n with the recesses 11L, 11m, 11n, the optical films 11a, 11 b, 11c can be accommodated in the corresponding accommodation portions 10f, 10g, 10h in correct orientation and postures.

The optical film 11a is an optical component for the imaging unit 2 and covers the through hole 10a and the lens 12. The optical film 11a optically adjusts light incident from the driver's seat side. Specifically, the optical film 11a is configured of a wire grid polarizing film, and changes the phase of the polarization direction of the light incident from the driver's seat side. Due to polarization effect of the optical film 11a, for example, light reflected by a lens of eyeglasses of the driver is shielded, and the light does not enter the lens 12 or the imaging unit 2.

The optical films 11b, 10c are optical components for the illumination unit 3. The optical film 11b covers the through holes 10b, 10c and the illumination units 3 provided deep inside the through holes 10b, 10c. The optical film 11c covers the through holes 10d, 10e and the illumination units 3 provided deep inside the through holes 10d, 10e. The optical films 11b, 11c optically adjust light incident from the illumination unit 3 side. Specifically, each of the optical film 11b, 11c is configured of a wire grid polarizing film, and changes the phase of the polarization direction of light incident from the illumination unit 3 side.

Guide grooves 10x, 10y, 10z are provided at a lower end portion and left and right end portions of the casing 10. Each of the guide grooves 10x, 10y, 10z is continuous in the thickness direction of the optical films 11a to 11 c. The guide grooves 10x, 10y, 10z are examples of a "first guide portion" of the present invention.

The cover 7 illustrated in FIG. 2 is made of synthetic resin having a light-shielding property. The cover 7 is provided with a horizontal portion 7h and a vertical portion 7u. The vertical portion 7u is provided at the rear of the horizontal portion 7h and continuously protrudes upward from the horizontal portion 7h. As illustrated in FIG. 9, the vertical portion 7u is configured of a front-side side wall $7u_1$, left and right side walls $7u_2$, $7u_3$, and a ceiling wall $7u_4$. The back side of the vertical portion 7u is open as illustrated in FIG. 10.

As illustrated in FIG. 9, three windows 7a, 7b, 7c are provided in an upper portion of the front-side side wall 7w of the vertical portion 7u of the cover 7. Each of the windows 7a, 7b, 7c is configured of a hole formed so as to penetrate the front-side side wall 7w. A transmission plate 17 is attached to the windows 7a, 7b, 7c so as to close each hole (FIG. 2). The transmission plate 17 is made of a light-transmissive synthetic resin and formed into a flat plate shape (FIG. 9).

As illustrated in FIG. 2, the vertical portion 7u of the cover 7 covers the casing 10, the optical films 11a, 11b, 11c, the imaging unit 2, the illumination unit 3, the sub board 9, and part of the FPC 14 illustrated in FIGS. 3 and 5, from the upper side, the front side, and the left and right sides. In addition, the horizontal portion 7h of the cover 7 covers part of the FPC 14 and part of the lid body 6 from above. The cover 7 is fixed to the holder portion 6h of the lid body 6 with a screw, not illustrated. The cover 7 is an example of a "covering member" of the present invention.

In a state where the cover 7 is attached as illustrated in FIG. 2, the transmission plate 17 faces the optical films 11a, 11 b, 11c, the lens 12, and the illumination unit 3 as illustrated in FIG. 6. The plate surface of the transmission plate 17 is not perpendicular to the optical axis Q of the lens 12, and is inclined at a predetermined angle. The plate surface of the transmission plate 17 is inclined as described above in order to suppress reflection of light from the illumination unit 3 and light from the driver on the plate surface of the transmission plate 17.

The window 7a of the cover 7 and a window frame portion 7d of the window 7a are provided so as to face the optical film 11a. The window 7a and the transmission plate 17 are a light incident port for the optical film 11a, the lens 12, and the imaging unit 2. The window 7b and a window frame portion 7e of the window 7b are provided so as to face the optical film 11b. The window 7c and a window frame portion 7f of the window 7c are provided so as to face the optical film 11c. The windows 7b, 7c and the transmission plate 17 are exit ports for light projected from the illumination unit 3 and having passed through the optical films 11b, 11c.

As illustrated in FIG. 10, supports 7i, 7j, 7k having projecting shapes are provided near the inner four corners of the window frame portions 7d, 7e, 7f of the windows 7a, 7b, 7c, respectively. As illustrated in FIG. 6, the supports 7i, 7j, 7k protrude toward the optical films 11a, 11b, 11c and support end portions of the optical films 11a, 11 b, 11c from the windows 7a, 7b, 7c side. The supports 7i, 7j, 7k are examples of a "first support" of the present invention.

The supports 7i, 7j, 7k are provided so as to be shifted in the radial direction of the optical films 11a, 11b, 11c from the supports 10i, 10j, 10k of the casing 10. In addition, the supports 7i, 7j, 7k are provided so as to face the depressions 10p, 10q, 10r of the casing 10 in the thickness direction of the optical films 11a, 11b, 11c.

As illustrated in FIG. 10, guide projections 7x, 7y, 7z are provided on the back side of the front-side side wall $7u_1$ and the back sides of the left and right side walls $7u_2$, $7u_3$ of the cover 7. The guide projections 7x, 7y, 7z are engaged with the guide grooves 10x, 10y, 10z (FIG. 7) of the casing 10, respectively. The guide projections 7x, 7y, 7z are examples of a "second guide portion" of the present invention.

In addition, on the back side of the horizontal portion 7h of the cover 7, a guide wall 7s is provided. As illustrated in FIG. 10, the guide wall 7s is diagonally formed from the front portion of the horizontal portion 7h toward an intersection portion between the front-side side wall $7u_1$, and the left side wall $7u_2$. The guide wall 7s is engaged with the guide wall 6s of the lid body 6 illustrated in FIG. 3. The guide wall 6w of the lid body 6 is engaged with the back surface of the left side wall $7u_2$ of the cover 7. The guide wall 6v is engaged with the back surface of the right side wall 7$u_3$ of the cover 7. In the assembled state of FIG. 2, the guide wall 7s and the left and right side walls 7$u_2$, 7$u_3$ of the cover 7 are parallel to the guide walls 6s, 6w, 6v of the lid body 6, respectively. In addition, the guide wall 7s and the left and right side walls 7$u_2$, 7$u_3$ are parallel to the thickness direction of the optical films 11a to 11c.

Further, as illustrated in FIG. 10, a step portion 7t is provided at the front end of the horizontal portion 7h and the end portion on the side wall 7$u_3$ side of the cover 7. The step portions 7t is engaged with the step portion 6t on the front side and the right side of the lid body 6 illustrated in FIG. 3 (FIG. 2).

Upon manufacturing of the occupant monitoring apparatus 100, before a process of attaching the cover 7 is performed, other parts are assembled as illustrated in FIGS. 3 to 5. At that time, when the optical films 11a, 11b, 11c are accommodated in the accommodation portions 10f, 10g, 10h of the casing 10, the optical films 11a, 11b, 11c are inserted into the frame walls 10s, 10t, 10u of the accommodation portions 10f, 10g, 10h so that the recesses 11L, 11m, 11n of the optical films 11a, 11b, 11c are engaged with the keys 10L, 10m, 10n of the accommodation portions 10f, 10g, 10h, respectively (state in FIG. 3).

Then, in the process of attaching the cover 7, first, the guide wall 7s (FIG. 10) of the cover 7 is engaged with the guide wall 6s from the front side (side opposite to the harness 16) of the lid body 6. Next, the guide wall 6s and the guide wall 7s are slid in the state of being engaged with each other, the vertical portion 7u of the cover 7 is brought close to the casing 10, and the back surfaces of the left and right side walls 7$u_2$, 7$u_3$ of the cover 7 and the guide walls 6w, 6v of the lid body 6 are engaged with each other, respectively. Next, the left and right side walls 7$u_2$, 7$u_3$ and the guide walls 6w, 6v are slid in the state of being engaged with each other, the casing 10 is fitted inside the vertical portion 7u of the cover 7, and the guide projections 7x, 7y, 7z of the cover 7 and the guide grooves 10x, 10y, 10z of the casing 10 are engaged with each other, respectively.

Next, the guide projections 7x, 7y, 7z and the guide grooves 10x, 10y, 10z are slid in the state of being engaged with each other and the casing 10, the sub board 9, and the holder portion 6h of the lid body 6 are accommodated inside the vertical portion 7u of the cover 7. As a result, the supports 7i, 7j, 7k of the cover 7 illustrated in FIG. 6 and the supports 10i, 10j, 10k of the casing 10 are guided so as to approach to each other in the thickness direction of the optical films 11a, 11b, 11c.

Then, the guide walls 6w, 6v (FIG. 3) are brought into contact with the back surface of the front-side side wall 7$u_1$ of the cover 7, the guide projections 7x, 7y, 7z of the cover 7 are brought into contact with the holder portion 6h of the lid body 6, and the step portion 7t of the cover 7 and the step portion 6t of the lid body 6 are engaged with each other. As a result, the cover 7 is positioned with respect to the casing 10 and the lid body 6. In addition, as illustrated in FIG. 6, the supports 7i, 7j, 7k of the cover 7 support the end portions of the optical films 11a, 11b, 11c from the windows 7a, 7b, 7c side. Further, the supports 10i, 10j, 10k of the casing 10 support the end portions of the optical films 11a, 11b, 11c from the imaging unit 2 side or the illumination unit 3 side. As a result, the optical films 11a, 11b, 11c are sandwiched in the thickness direction by the supports 7i, 7j, 7k and the supports 10i, 10j, 10k. In addition, since the supports 7i, 7j, 7k of the cover 7 press vicinities of the four corners of the optical films 11a, 11b, 11c into the depressions 10p, 10q, 10r, the optical films 11a, 11b, 11c do not slacken but are warped in an allowable range in terms of performance.

In the above state, the cover 7 and the holder portion 6h are fixed with a screw, not illustrated. As a result, the optical films 11a, 11b, 11c are fixed in the accommodation portions 10f, 10g, 10h without rattling, and the occupant monitoring apparatus 100 is assembled as illustrated in FIG. 2.

When the occupant monitoring apparatus 100 is installed in the vehicle, the portion of the cover 7 including the horizontal portion 7h and the portion lower than the horizontal portion 7h in FIG. 2 is embedded in the dashboard or the center console so as not to be seen by an occupant of the vehicle. An imaging system such as the illumination unit 3 and the imaging unit 2 is provided above the horizontal portion 7h of the cover 7. Therefore, the imaging system protrudes from the dashboard or the center console in order to capture an image of the driver's face. In addition, in order not to make the driver aware of being monitored, the imaging system is covered with a design cover, not illustrated. In the design cover, an opening is formed so as to expose the transmission plate 17.

By installing the occupant monitoring apparatus 100 in the center part of the dashboard or the upper part of the center console, the illumination unit 3, the lens 12, and the imaging unit 2 are directed to the driver's seat side. Therefore, light (infrared light) projected from the illumination unit 3 passes through the through holes 10b to 10e of the casing 10, the optical films 11b, 11c, the windows 7b, 7c of the cover 7, the transmission plate 17, and the opening of the design cover, and is projected to the driver's seat side. At this time, the optical films 11b, 11c change the phase of the polarization direction of the light projected from the illumination unit 3.

The light projected to the driver's seat side is reflected by a headrest or a seat of the driver's seat, the face of the driver sitting in the driver's seat, or the like. The reflected light passes through the opening of the design cover, the transmission plate 17, the window 7a of the cover 7, the optical film 11a, and the through hole 10a of the casing 10, is incident on the lens 12, passes through the lens 12, and is incident on the imaging unit 2. At this time, the optical film 11a changes the phase of the polarization direction of the light coming from the driver's seat side, and cuts (blocks) the light reflected by a lens of the glasses or the sunglasses that the driver wears. Then, the imaging unit 2 converts the light incident from the lens 12 into an electric signal and captures an image of the driver's face based on the electric signal. Thus, an image of the driver's eyes can be accurately captured.

According to the above embodiment, the end portions of the optical films 11a, 11b, 11c are supported by the supports 7i, 7j, 7k provided in the cover 7 from the windows 7a, 7b, 7c side, in the accommodation portions 10f, 10g, 10h of the casing 10. In addition, the supports 10i, 10j, 10k provided in the casing 10 support the end portions of the optical films 11a, 11b, 11c from the imaging unit 2 side or the illumination unit 3 side. Therefore, the optical films 11a, 11b, 11c are sandwiched in the thickness direction of the optical films 11a, 11b, 11c by the supports 7i, 7j, 7k and the supports 10i, 10j, 10k. Therefore, it is not necessary to use an adhesive or a double-sided tape and it is not necessary to provide a dedicated fixing member for the optical films 11a, 11b, 11c. Therefore, it is possible to reliably fix the optical films 11a, 11b, 11c without increasing the number of working processes during assembly of the occupant monitoring apparatus 100.

In addition, in the above embodiment, the supports 7i, 7j, 7k of the cover 7 press vicinities of the four corners of the optical films 11a, 11b, 11c into the depressions 10p, 10q, 10r adjacent to the supports 10*i*, 10*j*, 10*k*, respectively. Therefore, it is possible to fix the optical films 11*a*, 11*b*, 11*c* in a state of being warped in an allowable range in terms of performance without slackening the optical films 11*a*, 11*b*, 11*c*.

In addition, if the area of the optical films 11*a*, 11 *b*, 11*c* sandwiched is large, flexibility of the optical films 11*a*, 11*b*, 11*c* is impaired. Therefore, the optical films 11*a*, 11*b*, 11*c* are likely to be distorted due to stress applied to the sandwiched portions. However, in the above embodiment, the through holes 10*a* to 10*e* and the depressions 10*p*, 10*q*, 10*r* are formed in the inner back surfaces of the accommodation portions 10*f*, 10*g*, 10*h* of the casing 10. Thus, the area of the supports 10*i*, 10*j*, 10*k* formed of the rest of the inner back surfaces is made small. In addition, each of the supports 7*i*, 7*j*, 7*k* of the cover 7 is formed in a projecting shape so that the area of each of the front ends of the supports 7*i*, 7*j*, 7*k* is made small. Therefore, the sandwiched area of the optical films 11*a*, 11*b*, 11*c* by the supports 10*i*, 10*j*, 10*k* and the supports 7*i*, 7*j*, 7*k* is made small. Thus, flexibility of the optical films 11*a*, 11 *b*, 11*c* can be secured. Then, stress applied to the sandwiched portions of the optical films 11*a*, 11*b*, 11 *c* can be relieved at non-sandwiched portions, and the optical films 11*a*, 11 *b*, 11*c* can be prevented from being distorted.

In addition, in the above embodiment, each of the supports 7*i*, 7*j*, 7*k* of the cover 7 is provided in a plural manner so that the supports 7*i*, 7*j*, 7*k* support vicinities of the four corners of the optical films 11*a*, 11*b*, 11*c* having a rectangular shape, respectively. Therefore, the optical films 11*a*, 11 *b*, 11*c* can be stably supported from the windows 7*a*, 7*b*, 7*c* side by the supports 7*i*, 7*j*, 7*k*, respectively.

In addition, in the above embodiment, the supports 10*i*, 10*j*, 10*k* are provided around the through holes 10*a* to 10*e* in the front surface of the casing 10. Therefore, the end portions of the optical films 11*a*, 11*b*, 11*c* can be stably supported from the imaging unit 2 side or the illumination unit 3 side by the supports 10*i*, 10*j*, 10*k*, respectively.

In addition, in the above embodiment, the accommodation portions 10*f*, 10*g*, 10*h* are provided in the casing 10. Therefore, the optical films 11*a*, 11*b*, 11*c* can be temporarily installed in the accommodation portions 10*f*, 10*g*, 10*h*, respectively. Then, by engaging the cover 7 with the casing 10 in this state, the optical films 11*a*, 11*b*, 11*c* can be sandwiched between the supports 10*i*, 10*j*, 10*k* and the supports 7*i*, 7*j*, 7*k*. Therefore, it is possible to easily attach the optical films 11*a*, 11*b*, 11*c*.

In addition, in the above embodiment, when the cover 7 is being engaged with the casing 10 and the lid body 6, the guide grooves 10*x*, 10*y*, 10*z* provided in the casing 10 and the guide projections 7*x*, 7*y*, 7*z* provided in the cover 7 are engaged with and slide on each other. Thus, the supports 10*i*, 10*j*, 10*k* and the supports 7*i*, 7*j*, 7*k* are guided so as to approach each other in the thickness direction of the optical films 11*a*, 11 *b*, 11*c*. Therefore, the vicinities of the four corners of the optical films 11*a*, 11*b*, 11*c* can be sandwiched simultaneously by the supports 10*i*, 10*j*, 10*k* and the supports 7*i*, 7*j*, 7*k*, and the optical films 11*a*, 11*b*, 11*c* can be prevented from falling off from the accommodation portions 10*f*, 10*g*, 10*h*. In addition, the optical films 11*a*, 11 *b*, 11*c* are less likely to be distorted.

In addition, in the above embodiment, the plate surface of the transmission plate 17 attached to the windows 7*a*, 7*b*, 7*c* of the cover 7 is inclined with respect to the optical axis Q of the lens 12. Therefore, if the optical films 11*b*, 11*c* are slackened, distorted, or rattled, there is possibility that polarization effect of the optical films 11*b*, 11*c* for light from the illumination unit 3 is impaired and the polarization effect is further greatly impaired by the transmission plate 17. In addition, if the optical film 11*a* is slackened, distorted, or rattled, there is possibility that polarization effect of the optical film 11*a* for light from the driver having passed through the transmission plate 17 is greatly impaired.

However, as described above, by sandwiching the optical films 11*a*, 11 *b*, 11*c* in the thickness direction by the supports 7*i*, 7*j*, 7*k* of the cover 7 and the supports 10*i*, 10*j*, 10*k* of the casing 10, it is possible to prevent the optical films 11*a*, 11*b*, 11*c* from being slackened, distorted, or rattled. Therefore, the polarization effects of the optical films 11*a*, 11 *b*, 11*c* is not impaired, and the phase of the polarization direction of the light from the illumination unit 3 can be appropriately changed by the optical films 11*b*, 11*c*. In addition, it is possible to appropriately change the phase of the polarization direction of the light from the driver by the optical film 11*a*.

Further, in the above embodiment, the imaging unit 2 and the illumination unit 3 are installed in the casing 10 so as to be isolated from each other. The optical films 11*a* to 11*c*, the supports 10*i* to 10*k*, the through holes 10*a* to 10*e*, the accommodation portions 10*f* to 10*h* of the casing 10, and the supports 7*i* to 7*k* of the cover 7 are provided for the imaging unit 2 and the illumination unit 3. Therefore, by inserting the optical films 11*a*, 11*b*, 11*c* into the accommodation portions 10*f*, 10*g*, 10*h* of the casing 10 and then engaging the cover 7 with the casing 10 and the lid body 6, the optical film 11*a* for the imaging unit 2 and the optical films 11*b*, 11*c* for the illumination units 3 can be sandwiched between the corresponding supports 10*i*, 10*j*, 10*k* and the corresponding supports 7*i*, 7*j*, 7*k*. That is, it is possible to easily fix the plurality of optical films 11*a*, 11 *b*, 11*c* in an identical process.

The present invention can adopt various embodiments other than the above-described embodiment. For example, the above-described embodiment describes an example in which the supports 10*i*, 10*j*, 10*k* of the casing 10 are configured of the inner back surfaces of the accommodation portions 10*f*, 10*g*, 10*h*, and the supports 7*i*, 7*j*, 7*k* of the cover 7 are configured of a plurality of projections provided on the window frame portions 7*d*, 7*e*, 7*f*. However, the present invention is not limited to this. In addition to this, for example, supports having projecting shapes may be provided near four corners of inner back surfaces of accommodation portions 10*f*, 10*g*, 10*h* so that vicinities of four corners of optical films 11*a*, 11 *b*, 11*c* may be supported by the supports having the projecting shapes. In addition, end portions of optical films 11*a*, 11*b*, 11*c* may be supported by using window frame portions 7*d*, 7*e*, 7*f* of a cover 7 as supports. In addition, both a support of a casing and a support of a cover may be configured of a flat surface, a curved surface, or a projection whose front end has small area. Alternatively, a support configured of a flat surface, a support configured of a curved surface, or a support configured of a projection may coexist in a casing and a cover. In addition, an end portion other than vicinities of four corners of an optical film may be sandwiched between a support of a casing and a support of a cover.

In addition, the above embodiment describes an example in which the depressions 10*p*, 10*q*, 10*r* are provided in the accommodation portions 10*f*, 10*g*, 10*h* of the casing 10; however, the present invention is not limited to this. In addition to this, for example, depressions may be provided so as to be adjacent to supports 7*i*, 7*j*, 7*k* of a cover 7. In addition, for example, in a case where both a support of a casing and a support of a cover are formed of projections and the projections are shifted from each other in the radial direction of an optical film, depressions may be omitted.

In addition, in the above embodiment, the accommodation portions 10f, 10g, 10h (frame walls 10s, 10t, 10u) of the casing 10 and the optical films 11a, 11b, 11c are formed in a substantially rectangular shape when viewed from the cover 7 side. However, the present invention is not limited to this. The shapes of accommodation portions 10f, 10g, 10h and optical films 11a, 11 b, 11c as viewed from a cover 7 side may be other than a rectangular shape. In addition, in lieu of the frame walls 10s, 10t, 10u of the accommodation portions 10f, 10g, 10h, for example, one or more projections supporting an optical film at least from below may be provided on a front surface of a casing 10, and an upper part of the projection may serve as an accommodation portion. In addition, optical films other than a wire grid polarizing film may be used as optical films 11a, 11b, 11c.

In addition, the above embodiment describes an example in which the transmission plate 17 is attached to the windows 7a, 7b, 7c of the cover 7, and the plate surface of the transmission plate 17 is inclined with respect to the optical axis Q of the lens 12. However, the present invention is not limited to this. In addition to this, for example, the transmission plate 17 may be attached to windows 7a, 7b, 7c of the cover 7 so that a plate surface of the transmission plate 17 is perpendicular to an optical axis Q of the lens 12. In addition, the transmission plate 17 may be omitted.

In addition, the above embodiment describes an example in which the imaging unit 2 configured of an infrared image sensor and the illumination unit 3 configured an infrared LED are used. However, the present invention is not limited only to this, and another imaging unit and another illumination unit may be used. In addition, the number of imaging units to be installed and the number of illumination units to be installed may be appropriately selected. In addition, an imaging unit and an illumination unit may be installed in separate casings. In addition, one or more sets of an optical film, a first support, a second support, a through hole, and an accommodation portion may be provided according to the number of imaging units, or more than one sets of them may be provided according to the number of illumination units. Further, an optical film may be provided only for one of an imaging unit and an illumination unit.

In addition, in the above embodiment, the present invention is applied to the occupant monitoring apparatus 100 that monitors the driver by capturing an image of the vehicle driver's face. However, it is also possible to apply the present invention to an occupant monitoring apparatus that monitors the face of an occupant other than a vehicle driver or a part other than a face.

Further, the above embodiment describes an example in which the present invention is applied to the occupant monitoring apparatus 100 for the vehicle configured of a four-wheeled automobile. However, the present invention may also be applied to an occupant monitoring apparatus that monitors an occupant of another vehicle.

The invention claimed is:

1. An occupant monitoring apparatus comprising:
   an imaging unit configured to capture an image of an occupant of a vehicle;
   an illumination unit configured to project light toward an occupant side;
   a casing in which one of the imaging unit and the illumination unit is installed; and
   an optical film provided on the occupant side of one of the imaging unit and the illumination unit and configured to optically adjust incident light,
   the occupant monitoring apparatus monitoring the occupant according to an image captured by the imaging unit, the occupant monitoring apparatus further comprising:
   a covering member configured to cover the imaging unit, the illumination unit, the casing, and the optical film;
   a window provided in the covering member so as to face the optical film,
   a first support provided on a window frame portion of the window of the covering member; and
   a second support provided in the casing so as to face the window frame portion,
   the first support supporting an end portion of the optical film from a window side,
   the second support supporting the end portion of the optical film from one of an imaging unit side and an illumination unit side, and
   the optical film being sandwiched in a thickness direction of the optical film by the first support and the second support.

2. The occupant monitoring apparatus according to claim 1,
   wherein a depression is provided in one of the window frame portion and the casing so as to be adjacent to one of the first support and the second support in a radial direction of the optical film,
   wherein the first support and the second support are shifted from each other in the radial direction of the optical film, and
   wherein the depression and one of the first support and the second support not adjacent to the depression face each other in the thickness direction of the optical film.

3. The occupant monitoring apparatus according to claim 1,
   wherein at least one of the first support and the second support is provided so as to protrude toward the optical film.

4. The occupant monitoring apparatus according to claim 1,
   wherein the optical film is formed in a rectangular shape, and
   wherein at least one of the first support and the second support is provided in a plural manner so as to support vicinities of four corners of the optical film.

5. The occupant monitoring apparatus according to claim 1, further comprising:
   a first guide portion provided in the casing; and
   a second guide portion provided in the covering member,
   wherein the first guide portion and the second guide portion slide in a state of being engaged with each other and guide the first support and the second support such that the first support and the second support approach each other in the thickness direction of the optical film.

6. The occupant monitoring apparatus according to claim 1,
   wherein the optical film is made of a polarizing film configured to change a phase of a polarization direction of incident light, and
   wherein the window is configured of a hole formed so as to penetrate the covering member,
   the occupant monitoring apparatus further comprising:
   a transmission plate attached to the window so as to close the hole and configured to transmit light; and
   a lens configured to form an image of incident light on an imaging surface of the imaging unit, and wherein the transmission plate is provided such that a plate surface of the transmission plate is inclined with respect to an optical axis of the lens.

7. The occupant monitoring apparatus according to claim 1, wherein the casing includes:
   a through hole serving as a light path for one of the imaging unit and the illumination unit; and
   an accommodation portion provided in the casing so as to communicate with the through hole and to face the window and configured to accommodate the optical film, and
   wherein the second support is provided around the through hole in the accommodation portion.

8. The occupant monitoring apparatus according to claim 7,
   wherein the imaging unit and the illumination unit are installed in the casing so as to be isolated from each other; and
   wherein the optical film, the first support, the second support, the through hole, and the accommodation portion are provided for each of the imaging unit and the illumination unit.

* * * * *